Dec. 12, 1967 P. H. SCHULTE 3,358,275

MAGNETIC ERASE HEAD

Filed Nov. 1, 1963 2 Sheets-Sheet 1

INVENTOR
PAUL H. SCHULTE

BY Fisher, Christen, Sabol & Caldwell

ATTORNEYS

MAGNETIC ERASE HEAD

Filed Nov. 1, 1963 2 Sheets-Sheet 2

INVENTOR
PAUL H. SCHULTE

BY Fisher, Christen, Sabol & Caldwell
ATTORNEYS 3,358,275
MAGNETIC ERASE HEAD
Paul H. Schulte, D–9 Gardenia, San Francisco Urb., Rio Piedras, Puerto Rico
Filed Nov. 1, 1963, Ser. No. 320,751
3 Claims. (Cl. 340—174.1)

ABSTRACT OF THE DISCLOSURE

This invention relates to a magnetic erase head which comprises a pair of housings, each of generally flat configuration and each including inwardly turned flanges substantially along three sides thereof, such that the housings when in opposed relation define an enclosure therebetween. The flat walls of each housing include a pair of inwardly turned magnetic projections at corresponding locations. Magnetic pole pieces of generally U-shaped configuration are gripped by the opposed projections and extend to the operative face formed by the housings. A pair of non-magnetic spacers are disposed between the housings along the operative face in abutting engagement with each of the pole pieces. Indexing bosses are formed on each of the housings in precise alignment with common portions of the spacers. Electrical coils are disposed on the pole pieces with the legs of the spacers penetrating the coils in order that magnetic flux may be established through pole pieces and across the gaps formed by the non-magnetic spacers with the return path being via the non-magnetic housings themselves and the projections in contact with the spacers. This arrangement provides a double gap erase head.

The present invention relates to magnetic heads adapted to erase signals from magnetic tape. It apertains to such heads, per se, and also to such heads particularly adapted for ready operative association as erase units in multiple function combination heads.

While combination record-playback and erase heads are known, such multiple heads are not truly flexible. For example, any damaged sections usually may not be replaced without replacement of the entire head, nor in fact, do the multiple designs admit of optimum performance characteristics for each module thereof as achieved through separate manufacture at minimum costs with ready association in precise alinement. Such heads also do not permit ready assembly in any desired succession such as, erase, record, erase or record, erase, playback, etc. Moreover, usually low test or shrinkage with respect to any integral section of a multiple head renders useless the entire device, even during manufacture.

Accordingly, it is a primary object of the present invention to provide an erase head structure of a type admitting of ready manufacture, in mass production quantity, to permit an effective, highly efficient, low priced unit to be made.

It is a further object to provide such an erase head which is compatible with other heads in ready connection thereto for operative association therewith in precise track alinement.

Essentially, economy of manufacture and reliable operation is achieved through a head which minimizes components. For example, the head of the subject invention actually employs the housing to carry the flux to form part of the magnetic paths for the erase gaps.

Another feature of the invention resides in the indexing of the gaps or pole pieces forming the gaps to external structure which in turn is compatible for ready association in precise alinement to heads for performing other functions. The extreme inherent accuracies of die techniques are adapted to the production of the indexing structure in its relation to the critical magnetic gaps for enabling accurate indexing of the erase head, per se, to tape tracks or of the erase head gaps to gaps of associated heads for single or multiple track alinement.

A further feature of the invention resides in the provision of an erase head which is radiused off-center to permit operative association of such heads with, for example, a record-playback head, enabling tape wrap with little or no pressure pad requirement. The indexing and mounting structure incorporated is compatible with this feature.

The invention may employ double pole piece and gap forming structure between the mated halves of the housing to facilitate sequential gaps for each erase track, with separate parallel magnetic paths available for each track. However, the principles of the invention are realized without resort to sequential gaps, but through the use of a single gap for any given track.

Another feature of the invention resides in the large heat sink for heat dissipation occasioned by the magnetic path being an integral part of and firmly sandwiched between the mated housings. Also, good heat conductivity is available to the mounting brackets or structure. Furthermore, this structure enables the production of an extremely thin erase head because of the absence of extra or independent magnetic paths and associated isolation structure.

A still further feature of the invention is the forming of a portion of the magnetic paths from material lanced from the housing as an allied operation to that which produces the external embossings for indexing, all in alinement.

Indexing of the gaps to the external embossed indexing structure is facilitated through the employment of pole pieces of a length sufficient to extend beyond the face of the erase head during assembly, such that the extension enables jigging or fixturing in relation to the preformed bosses to permit precise alinement of the structure preparatory to encapsulating, which thereafter firmly holds the internal components. Finishing of the face of the head may separate plural gap forming structure to actually develop the gaps; and the offset radius, if desired.

The foregoing description will become more apparent to those skilled in the art when the invention is detailed in connection with a preferred embodiment, as illustrated in the accompanying drawing, wherein.

Figures 1, 2, 3, 4:
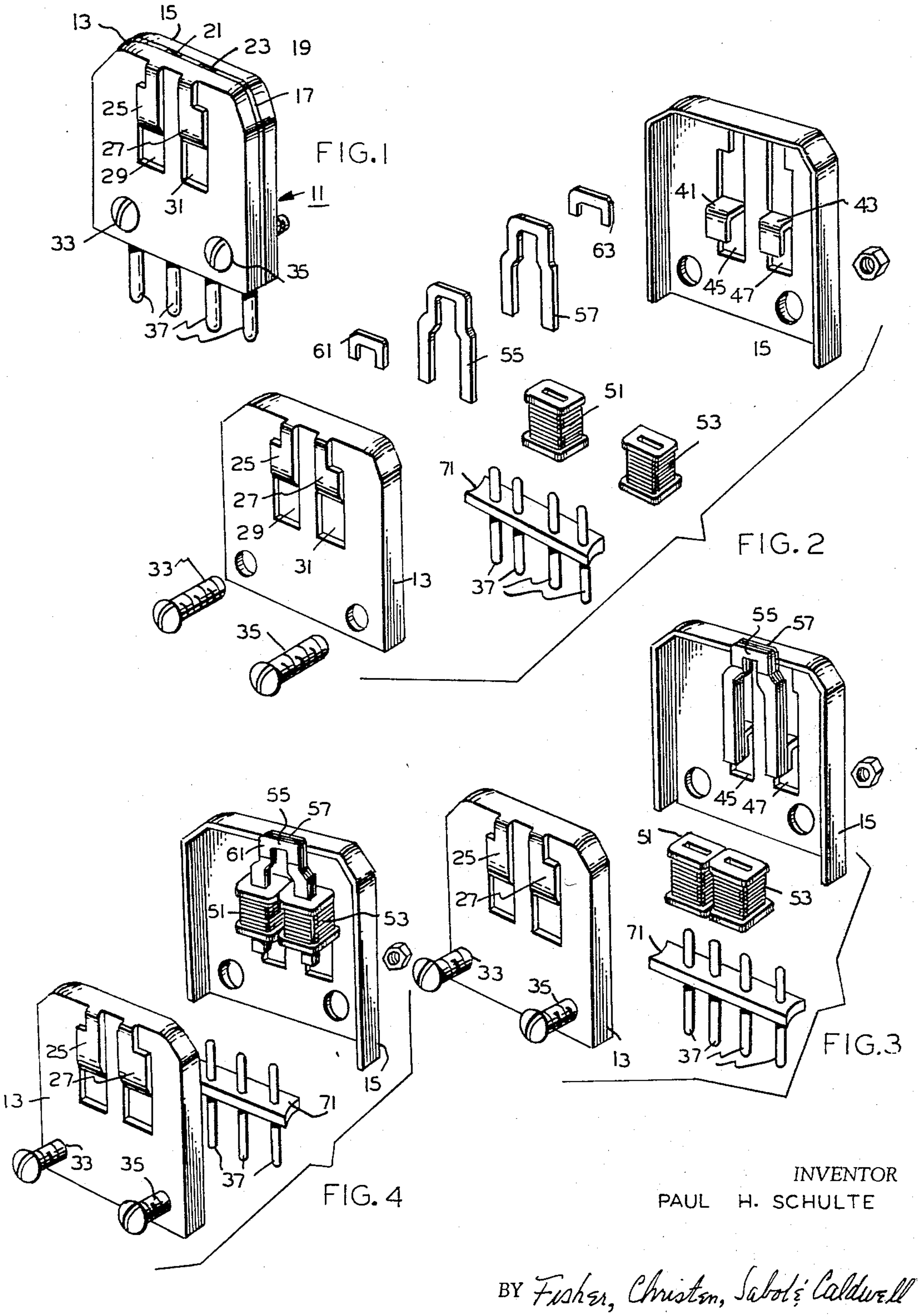
FIG. 1 is a view in perspective of an erase head, per se.
FIG. 2 is an exploded view, showing the components of the erase head of FIG. 1.
FIGS. 3, 4, 5 and 6 depict successive stages in the assembly of the head of FIG. 1.

Referring now to FIG. 1, it may be seen that the erase head 11 is assembled from mated semi-housings 13 and 15, of high permeability magnetic material, which may be punched and drawn from the same die, and which are generally epoxied together with the slight separation visible as the epoxy filling 17.

Generally, the operative face of the head 11 is illustrated at 19 and the track gaps are shown at 21 and 23. These gaps are respectively in alinement with the boss structures 25 and 27, visible on the exterior of housing 13. Also, apertures 29 and 31, open to the interior of the head (generally to the encapsulating filling) reveal that portions of the outer shell have been lanced inwardly to form parts of the magnetic paths to be described.

Mounting screws 33 and 35 are shown for connecting the erase head 11 to other heads for multiple use or to mounting brackets for the erase function, per se. Also, the terminals 37 are provided for electrical connection with the internal coils associated with the multiple gaps 21 and 23.

Next, looking at the assembly drawings of FIGS. 2 through 6, it may be noted that the external housings 13 and 15 are identical in form, each being a peripheral flanged semi-enclosure stamped and drawn from magnetic material having a high permeability rating. Normally such housings are annealed after being formed, as at FIG. 2, to relieve the stresses and restore full magnetic permeability.

In FIG. 2 the inwardly extending projections or tabs 41 and 43 of housing 15 are clearly visible. In the die formation the projections 41 and 43 are punched from the material of the housing 15, leaving the apertures 45 and 47. Forming of these tabs or projections 41 and 43 gives the right angle appearance wherein a portion of each tab is inwardly turned and its extreme portion depends therefrom. A pair of identical and similarly situated tabs (not shown) is included in the housing 13. These four projections cooperate in providing platforms upon which the electrical coils 51 and 53 are fitted and also act to close the magnetic path for these coils.

Magnetic cores or pole pieces adapted to be gripped between the projections of the housings 13 and 15 are preferably initially in the U-shaped configurations, shown at 55 and 57. The magnetic configurations 55 and 57 are inserted through the coils 51 and 53 in adjacent relationship and the coils are rested upon the projections 41 and 43, for assembly as best seen in FIG. 4.

Non-magnetic spacers 61 and 63 (FIG. 2) of copper or brass, for example, are disposed between the edges of the housings 13 and 15 and the abutting magnetic configurations 55 and 57 for assembly. In each of FIGS. 3 through 6 it will be seen that the pole piece structures and spacers project beyond the common plane or face, formed when the housings 13 and 15 are brought together. It is these projecting extremities which are gripped by the jig and fixtures (not shown) for precisely aligning the upriser portions of the spacers and pole piece structures defining the gaps with the indexing bosses 25 and 27 (FIG. 6) such that the gaps to be formed by the removal of the horizontal (as viewed in FIG. 6) integral connections between the vertical uprisers of the spacers and magnetic pole pieces are accurately indexed thereto.

Figure 5:
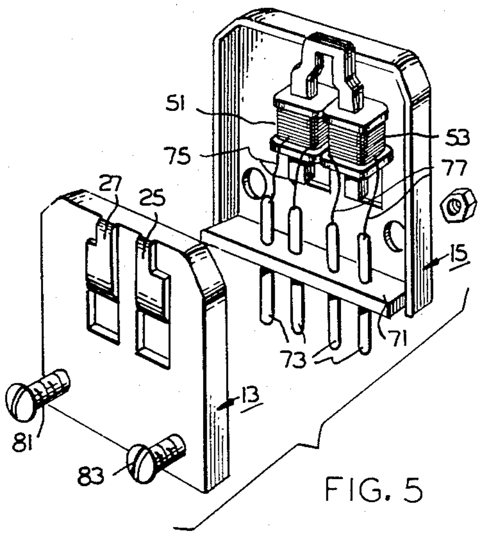

A phenolic or the like closure member 71, with electrical terminals 73 set therein, is disposed in the open end of the box-like configuration formed by the housings 13 and 15. The electrical connection from the coils to the terminals is made as shown by the wires 75 and 77 for the respective coils 51 and 53 as seen in FIG. 5.

Figure 6:
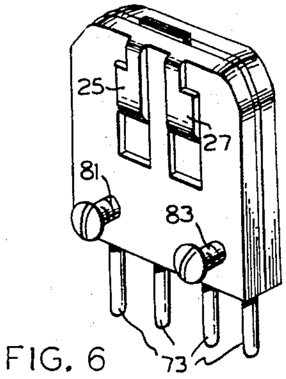

Following assembly of the structure to the form shown in FIG. 6, the internal components are epoxied in position, a suitable resin being poured through the arcuate end of the phenolic spacer 71 and the shell formed by the housing and allowed to harden to maintain alinement during the subsequent finishing of the head. It should be noted that the protruding portions of the spacer and magnetic configurations, as shown in FIG. 6, are finished off to open up the U-shaped configurations thereby separating the gaps to comprise a two-track erase head. Obviously the principles explained herein will encompass a monaural or other type single track (or even double track) erase head and the U-shaped configuration will be dispensed with, being replaceable by linear magnetic cores and spacers for assembly.

Figure 9:
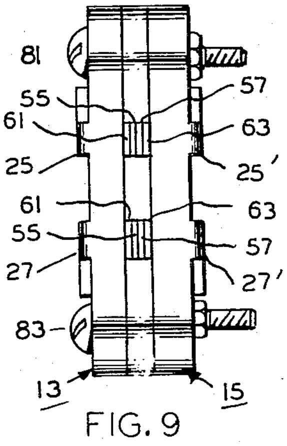
FIG. 9 is a view of the operative face of the head.
Figure 8:
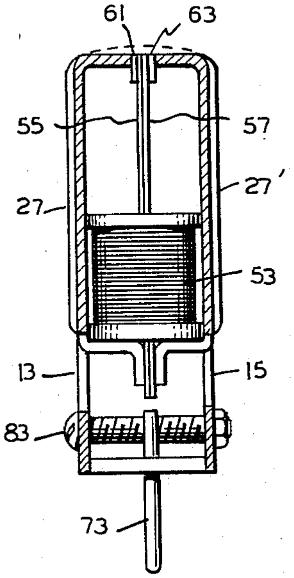
FIG. 8 is a view in cross section of the fully assembled head.

From FIGS. 8 and 9 it will be seen that each track includes successive gaps formed respectively by portions of the non-magnetic spacers 61 and 63. Also, from FIG. 9, it may be seen that the housings 13 and 15 actually do not contact each other, but are separated by the width of the double spacers and double magnetic pole pieces, a distance of approximately 0.018 inch. This separation is shown exaggerated relative to the head thickness in FIG. 9 to illustrate the component makeup, the head being quite thin because of the elimination of conventionally required parts. It is the epoxy filling which fixes the housings together, and the screws 81 and 83 are only provided for mounting the erase head to a bracket or to other heads, the screw holes being large enough to permit actual indexing to be done by the bosses 25 and 27.

Figure 7:
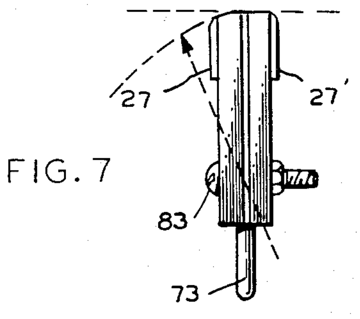
FIG. 7 is a view in side elevation of the assembled head, to show the off-center radiusing of the operative face thereof.

Also, during finishing of the erase head, the operative face, including the gaps, may be radiused off-center (FIG. 7) for the heads which are to be associated with record or playback heads. The center for finishing is offset only a fraction of an inch, e.g. 1/8", and accordingly the showing of FIG. 7 is exaggerated. However, it is this particular configuration which permits the erase head to be locked-in or snapped-in to a complementary record or playback head (having wells or recesses to receive the bosses 25 and 27) to permit pressure pad elimination while maintaining tape wrap.

It should be appreciated that the use of double pole piece thicknesses (55 and 57) along with two spacers (61 and 63) serves to provide parallel flux paths for each track, i.e., one path per gap. This is a feature, but is not essential to operation and either a spacer or a pole piece, or both, may be eliminated. Obviously, a single gap per track is provided when one spacer is eliminated.

It should also be noted that the bosses 25 and 27 include edges which are both normal and parallel with the gaps. Such edges or shoulders enable indexing as to gap height as well as gap to track alinement.

Other modifications and alternatives will occur to those skilled in the art from a reading hereof and accordingly it is intended that the invention be limited only by the appended claims, wherein:

What is claimed is:

1. A magnetic erase head comprising in combination a pair of similar magnetic housings, each including peripheries partially flanged, in opposed relation; spaced apart portions of said housings projecting inwardly at corresponding locations in pairs with the projecting portions having inwardly projecting legs and depending legs therefrom and being cut from the housings to leave windows therethrough; other spaced apart portions of the housings being bossed outwardly as indexing structure; a pair of generally U-shaped magnetic pole pieces gripped between opposed pairs of depending legs of the housings when opposed and extending from said portions to penetrate a common surface of the head between the housings; a non-magnetic gap spacer disposed on either side of each pair of pole pieces to magnetically isolate the pole pieces from the housings for magnetic gap formation; said indexing structure including edges parallel to and a right angles to the gaps; an electrical coil on each pair of pole pieces for establishing magnetic flux to circulate through the pole pieces and follow paths through the housings including said portions of the housings; means for establishing electrical connection to each electrical coil; and, a filler encapsulating the pole pieces, coils and spacers and maintaining the opposed relation of the housings.

2. A magnetic erase head comprising in combination a pair of magnetic permeable housings, each of generally flat configuration and including inwardly turned flanges substantially along three sides thereof whereby the housings, when in opposed relation, define an enclosure therebetween; a pair of inwardly turned magnetic projections at corresponding locations in each housing; each of said inwardly turned magnetic projections having depending legs and said projections and legs being partly cut from the housings to leave windows therethrough; a pair of adjacent magnetic pole pieces adapted to be gripped by each pair of opposed projections by the depending legs and extending to a common face formed by the housings;

non-magnetic gap forming means between the housings extending to the common face and in abutting engagement with each housing and each pole piece of each pair; indexing bosses on each of said housings in precise alinement with the pole piece pairs at the common face; electrical coils on each pair of pole pieces for establishing magnetic flux through the pole pieces, across the gaps and through the magnetic housings including the projections; and, epoxy filling the enclosure and maintaining the gap spacing between the housings whereby each pair of magnetic pole pieces provides parallel magnetic paths with gaps for each coil.

3. A magnetic erase head comprising in combination a pair of housings each of generally flat configuration and including inwardly turned flanges substantially along three sides thereof whereby the housings when in opposed relation define an enclosure therebetween; a pair of inwardly turned magnetic projections at corresponding locations in each housing; each of said projections including depending legs substantially parallel with the flat configuration of the housings and said projections being cut and bent from the housings to leave openings therethrough magnetic pole pieces adapted to be gripped by the opposed projections and extending to a common face formed by the housings; a pair of non-magnetic spacers disposed between the housings along said common face in abutting engagement with each of said pole pieces; indexing bosses on each of said housings in precise alinement with common portions of said spacers; and, electrical coil means on said pole pieces for establishing magnetic flux through the pole pieces across the gaps formed by the non-magnetic spacers and through the magnetic housings including the projections.

References Cited

UNITED STATES PATENTS

| | | | |
|---|---|---|---|
| 3,222,461 | 12/1965 | Wood et al. | 179—100.2 |
| 3,233,046 | 2/1966 | Moehring | 340—174.1 |
| 3,274,347 | 9/1966 | Page | 179—100.2 |

FOREIGN PATENTS

| | | |
|---|---|---|
| 769,651 | 3/1957 | Great Britain. |

BERNARD KONICK, *Primary Examiner.*

V. P. CANNEY, *Assistant Examiner.*